United States Patent
Tan et al.

(10) Patent No.: US 11,073,199 B2
(45) Date of Patent: Jul. 27, 2021

(54) BREATHER DEVICE

(71) Applicants: TOYOTA JIDOSHA KABUSHIKI KAISHA, Toyota (JP); AISIN AW CO., LTD, Anjo (JP)

(72) Inventors: Guodong Tan, Toyota (JP); Shinichi Ito, Anjo (JP); Yukihiko Ideshio, Nissin (JP); Masashi Ikemura, Toyota (JP); Takashi Iijima, Anjo (JP); Masamichi Yamaguchi, Anjo (JP); Keisuke Tanaka, Anjo (JP); Tetsuya Yamaguchi, Anjo (JP); Ryota Yoshimoto, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/929,156

(22) Filed: Jul. 15, 2020

(65) Prior Publication Data

US 2021/0018085 A1    Jan. 21, 2021

(30) Foreign Application Priority Data

Jul. 17, 2019    (JP) .............................. JP2019-132295

(51) Int. Cl.
*F16H 57/027* (2012.01)
*F16H 61/00* (2006.01)

(52) U.S. Cl.
CPC ..... *F16H 57/027* (2013.01); *F16H 2061/004* (2013.01)

(58) Field of Classification Search
CPC .. F16H 57/02; F16H 57/027; F16H 2061/004; F16H 61/4174; H02K 2205/09
See application file for complete search history.

(56) References Cited

U.S. PATENT DOCUMENTS

| | | | |
|---|---|---|---|
| 2003/0010151 A1* | 1/2003 | Johnson | F16H 57/027 74/606 R |
| 2004/0025942 A1* | 2/2004 | Kim | F16H 57/027 137/493 |
| 2008/0000534 A1* | 1/2008 | Tabor | F16K 11/07 137/625.66 |
| 2009/0140522 A1* | 6/2009 | Chapple | F03D 7/0224 290/43 |
| 2010/0032242 A1* | 2/2010 | Lin | F16K 17/0406 184/6.12 |

(Continued)

FOREIGN PATENT DOCUMENTS

JP    04-004348 A    1/1992

*Primary Examiner* — Prasad V Gokhale
(74) *Attorney, Agent, or Firm* — Oblon, McClelland, Maier & Neustadt, L.L.P.

(57) ABSTRACT

A breather device that communicates an inside of a case with an outside of the case in a vertical direction includes a cylindrical body having a hollow portion that extends in the vertical direction, a stopper inserted in the hollow portion, and a blocking body that is located in a space defined by the stopper in the hollow portion, and blocks a communicating hole provided in a lower part of the cylindrical body as viewed in the vertical direction. The communicating hole ceases to be blocked when the pressure inside the case exceeds a first predetermined value, and the blocking body moves upward in the vertical direction in the space.

9 Claims, 5 Drawing Sheets

(56) References Cited

U.S. PATENT DOCUMENTS

2015/0260237 A1* 9/2015 Saito ................. F16D 25/10
                                                192/48.619
2019/0264795 A1* 8/2019 Nakayama ............. F16K 17/06

* cited by examiner

BREATHER DEVICE

CROSS-REFERENCE TO RELATED APPLICATION

This application claims priority to Japanese Patent Application No. 2019-132295 filed on Jul. 17, 2019, incorporated herein by reference in its entirety.

BACKGROUND

1. Technical Field

The disclosure relates to a breather device that communicates the inside of a case with the outside of the case.

2. Description of Related Art

For example, a breather device that communicates the inside of a case with the outside of the case, as described in Japanese Unexamined Patent Application Publication No. 4-4348 (JP 4-4348 A), is known. In the breather device, an opening of a communicating hole that communicates with the case in a vertical direction is normally blocked by a spherical body (steel ball), such that outside air or foreign matter is prevented from entering the inside of the case, and the blocking is released when the pressure inside the case increases, for communication between the inside and outside of the case.

SUMMARY

In the breather device described in JP 4-4348 A, downward bias force is applied by a spring to the spherical body so as to block the communicating hole. Therefore, air cannot be discharged from the inside of the case, unless pressing force applied upward to the spherical body due to the pressure inside the case exceeds the sum of the self-weight (gravity) of the spherical body and the bias force of the spring. Accordingly, air may not be discharged when the pressure inside the case is low.

The disclosure provides a breather device that allows air to be discharged from a case even when the pressure inside the case is low.

A breather device according to one aspect of the disclosure communicates an inside of a case with an outside of the case in a vertical direction, and includes a cylindrical body having a hollow portion that extends in the vertical direction, a stopper inserted in the hollow portion, and a blocking body that is located in a space defined by the stopper in the hollow portion, and blocks a communicating hole provided in a lower part of the cylindrical body as viewed in the vertical direction. The communicating hole ceases to be blocked when a pressure inside the case exceeds a first predetermined value, and the blocking body moves upward in the vertical direction in the space.

With the above arrangement, the communicating hole ceases to be blocked when the pressing force applied upward in the vertical direction to the blocking body due to the pressure inside the case exceeds the self-weight (gravity) of the blocking body. Accordingly, the first predetermined value at which air is discharged from the inside of the case can be set to a lower value, as compared with the case where bias force other than the self-weight is applied to the blocking body. Thus, air can be discharged when the pressure inside the case exceeds the first predetermined value that is set to a relatively low value. The blocking body blocks the communicating hole when the pressure inside the case is equal to or lower than the first predetermined value; therefore, air outside the case is prevented from being sucked into the inside of the case.

In the above aspect, the cylindrical body may include an inclined portion having a diameter that increases as an upward distance from the communicating hole in the vertical direction increases, and the blocking body may be a spherical body having a larger diameter than the communicating hole. The blocking body may be configured to block the communicating hole when the blocking body sinks along the inclined portion.

With the above arrangement, the blocking body in the form of the spherical body is configured to sink along the inclined portion, to block the communicating hole. Thus, the communicating hole can be blocked even when the case is inclined.

In the above aspect, the breather device may further include a main body having a through portion that extends through the main body in the vertical direction. The cylindrical body may be fitted in the through portion, and the stopper may be fitted in the hollow portion. The cylindrical body may be configured to move in the vertical direction. The communicating hole may be configured to be blocked when the pressure inside the case exceeds a second predetermined value that is higher than the first predetermined value, and the cylindrical body moves upward in the vertical direction.

With the above arrangement, when the oil flows from the inside of the case to the hollow portion of the breather device, and the pressure inside the case exceeds the second predetermined value, the cylindrical body moves upward, so that the blocking body blocks the communicating hole. Thus, flow of the oil from the inside of the case to the outside via the breather device is curbed.

In the breather device described above, the communicating hole may have a smaller diameter than a portion of the hollow portion in which the stopper is fitted.

With the above arrangement, when the oil flows from the inside of the case to the hollow portion of the breather device, the inside oil pressure as the oil pressure of the oil in the hollow portion of the cylindrical body as the destination of the flow can be made smaller than the outside oil pressure as the oil pressure of the oil on the outer side of the cylindrical body (the inner side of the case) as the origin of the flow. Thus, the pressing force that moves the cylindrical body upward in the vertical direction (force obtained by subtracting the product of the inside oil pressure and the inside pressure-receiving area from the product of the outside oil pressure and the outside pressure-receiving area) is set with an increased degree of freedom, and the second predetermined value at which the blocking body blocks the communicating hole is set with an increased degree of freedom.

In the breather device as described above, the diameter of the communicating hole may be equal to or larger than one millimeter.

When the diameter of the communicating hole is equal to or larger than one millimeter, the oil containing air can easily pass through the communicating hole, and air contained in the oil can be discharged.

In the breather device as described above, a volume of the space may be reduced as the cylindrical body moves upward in the vertical direction.

When the volume of the space is reduced due to upward movement of the cylindrical body in the vertical direction, the pressure in the space increases accordingly. As a result, the cylindrical body moves upward in the vertical direction while its speed is reduced due to the pressure in the space; therefore, an impact applied to the blocking body when the cylindrical body collides with the blocking body is alleviated, and the durability of the breather device is improved.

In the above aspect, the case may be an oil pipe to which oil having an oil pressure increased by an oil pump is delivered.

In this case, the oil pressure in the oil pipe to which the oil is delivered from the oil pump can be quickly raised, and flow of the oil to the outside of the oil pipe via the breather device is curbed.

In the above aspect, the case may be an oil chamber case of an oil chamber in an actuator that controls a brake for a transmission.

In this case, air in the oil chamber of the actuator is quickly discharged; therefore, the initial response of the brake for the transmission is quickened, and the shift response performance is stabilized. While the shift response performance is stabilized, flow of the oil to the outside of the oil chamber case via the breather device is curbed, and a loss of flow of the oil in the oil chamber of the actuator is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Some embodiments of the disclosure will be described in detail with reference to the drawings. In the following embodiments, parts or components illustrated in the drawings are simplified or modified as needed, and the ratio of dimensions, shape, etc. of each part or component are not necessarily depicted with accuracy.

Figure 1:
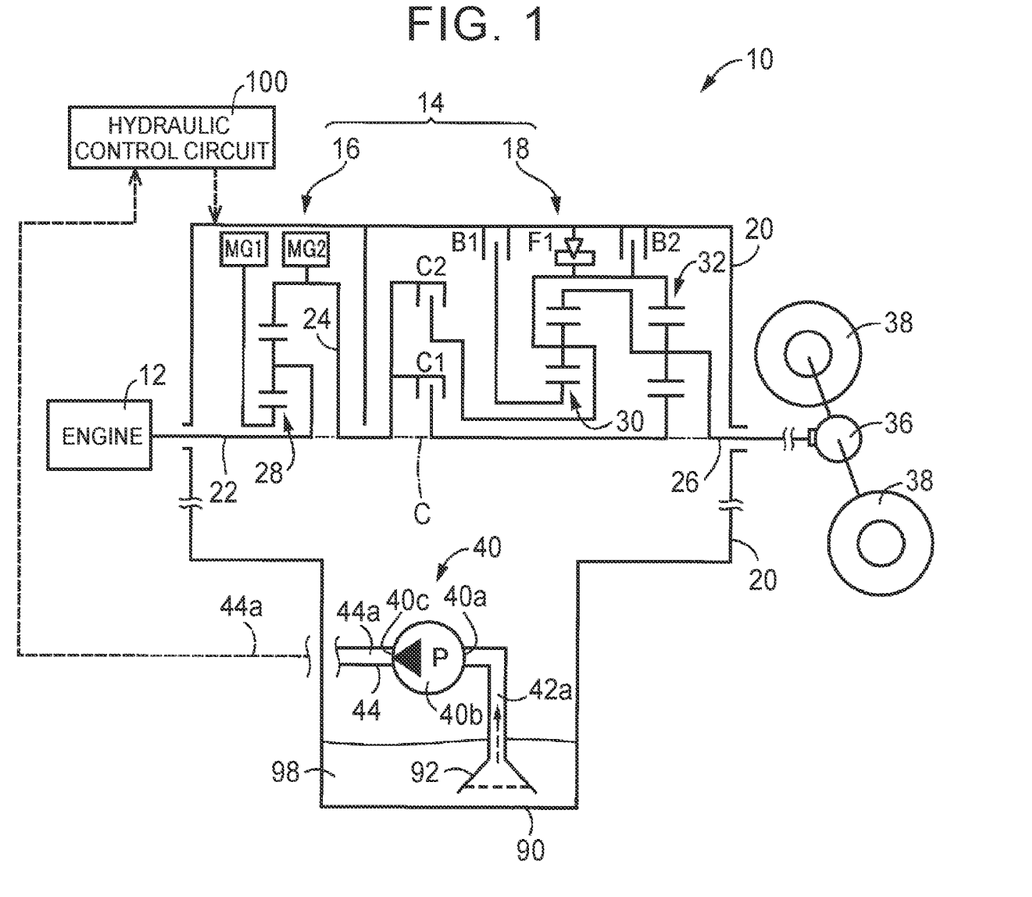
FIG. 1 is a view showing the configuration of a vehicle on which a breather device according to a first embodiment of the disclosure is installed.

FIG. 1 shows one example of the configuration of a vehicle 10 on which a breather device 50 according to a first embodiment of the disclosure is installed. The vehicle 10 is a hybrid vehicle, for example, and includes an engine 12, first motor MG1, second motor MG2, power transmission device 14, differential gear set 36, a pair of drive wheels 38, electric oil pump 40, and hydraulic control circuit 100. In FIG. 1, the positional relationships among respective constituent elements in the vertical direction are not accurately expressed.

The engine 12 is an internal combustion engine, such as a gasoline engine or a diesel engine.

The power transmission device 14 is illustrated in a skeleton diagram of FIG. 1. The power transmission device 14 is constructed generally symmetrically with respect to a rotation center line C. In the skeleton diagram of FIG. 1, the lower half of the power transmission device 14 below the rotation center line C is not illustrated. The power transmission device 14, which is housed in a housing 20, is disposed between the engine 12 and a pair of drive wheels 38, and includes an input shaft 22, differential unit 16, stepped speed change unit 18, and output shaft 26. The housing 20 is provided as a non-rotary member mounted on a vehicle body.

The input shaft 22 is an input rotary member of the power transmission device 14 placed on the common rotation center line C in the housing 20. The differential unit 16 is a stepless speed change unit that is directly coupled to the input shaft 22 or indirectly connected to the input shaft 22 via a pulsation absorption damper (not shown), for example. The stepped speed change unit 18 is connected to the differential unit 16 via a transmission member 24. The output shaft 26 is an output rotary member of the power transmission device 14 which is coupled to the stepped speed change unit 18.

The differential unit 16 mechanically distributes power received from the input shaft 22, to the first motor MG1 and the second motor MG2. The second motor MG2 is operatively coupled to the transmission member 24 such that the motor MG2 rotates as a unit with the transmission member 24. Each of the first motor MG1 and the second motor MG2 is connected to a power storage device via an inverter (not shown). With the inverter controlled, rotation of each of the first motor MG1 and second motor MG2 is controlled. The first motor MG1 and the second motor MG2 are both so-called motor-generators each functioning as a motor and a generator. The differential unit 16 consists principally of a single-pinion type planetary gear set 28 for distribution. The first motor MG1, second motor MG2, and planetary gear set 28 for distribution are connected to each other in the way as shown in FIG. 1.

The stepped speed change unit 18 is provided between the transmission member 24 and the output shaft 26. The stepped speed change unit 18 is a multi-speed transmission of planetary gear type, which functions as an automatic transmission having two or more gear positions. The stepped speed change unit 18 includes a single-pinion type first planetary gear set 30, single-pinion type second planetary gear set 32, first clutch C1, second clutch C2, first brake B1, second brake B2, and one-way clutch F1. The first planetary gear set 30, second planetary gear set 32, first clutch C1, second clutch C2, first brake B1, second brake B2, and one-way clutch F1 are connected to one another in the way as shown in FIG. 1. Here, the first clutch C1 and the second clutch C2 are hydraulic friction devices that are selectively engaged and disengaged, and the first brake B1 and the second brake B2 are hydraulic friction devices that are selectively engaged with and disengaged from the housing 20 as the non-rotary member. The stepped speed change unit 18 changes the speed of rotation of the transmission member 24, and outputs the resulting rotary power to the output shaft 26.

The power transmitted to the output shaft 26 of the power transmission device 14 is transmitted to the drive wheels 38 via the differential gear set 36.

The electric oil pump 40 is a known electrically powered oil pump of an internal gear type or external gear type, which is rotated/driven by an electric motor (not shown), for example. The electric oil pump 40 includes a suction port 40a, pressure increasing portion 40b having internal gears or external gears, and a discharge port 40c. The suction port 40a is an opening through which oil 98 is sucked into the electric oil pump 40. The pressure increasing portion 40b increases the oil pressure of the oil 98 introduced from the suction port 40a. The discharge port 40c is an opening through which the oil 98 whose oil pressure has been increased in the pressure increasing portion 40b is discharged. The electric oil pump 40 is one example of the "oil pump" of the disclosure.

In a condition where the electric oil pump 40 is driven, the oil 98 (e.g., automatic transmission fluid (ATF)) stored in an oil pan 90 provided in a lower part of the housing 20 that houses the power transmission device 14 is sucked into the suction port 40a of the electric oil pump 40, as indicated by a broken-line arrow in FIG. 1. More specifically, the oil 98 stored in the oil pan 90 is drawn in through an oil strainer 92, and is sucked into the suction port 40a, via a suction oil passage 42a. Then, the oil 98 whose oil pressure has been increased by the pressure increasing portion 40b of the electric oil pump 40 is delivered, or fed under pressure, from the discharge port 40c of the electric oil pump 40 to the hydraulic control circuit 100. The oil pressure of the oil 98 fed under pressure to the hydraulic control circuit 100 provides the original pressure for use in control for changing the gear position of the stepped speed change unit 18 in the hydraulic control circuit 100 and supply of lubricating oil to the power transmission device 14.

The hydraulic control circuit 100 receives a hydraulic control signal for controlling change of the speed of the stepped speed change unit 18, from an electronic control unit (ECU) (not shown). The hydraulic control circuit 100 generates control oil pressures for engaging and disengaging the hydraulic friction devices (first clutch C1, second clutch C2, first brake B1, and second brake B2) provided in the stepped speed change unit 18, based on the received hydraulic control signal, using the oil pressure of the oil 98 fed under pressure, as the original pressure. Then, the hydraulic control circuit 100 delivers the control oil pressures to actuators of the respective hydraulic friction devices. Also, the hydraulic control circuit 100 generates lubricating oil pressure to which the oil pressure of the oil 98 fed under pressure, as the original pressure, is regulated for supply of lubricating oil, and supplies the oil 98 as lubricating oil to the power transmission device 14 including the stepped speed change unit 18.

Figure 2:
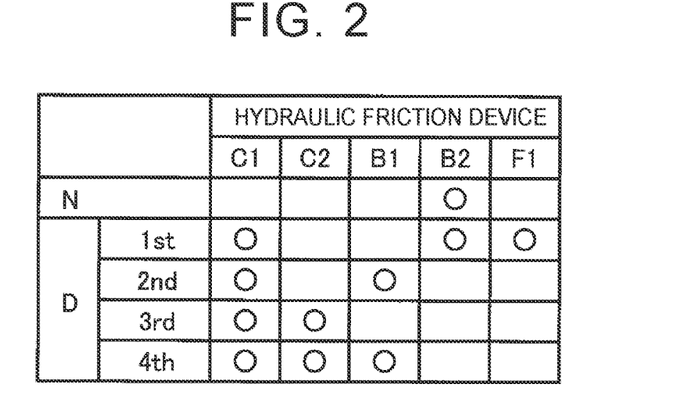
FIG. 2 is an operation table indicating combinations of operating states of hydraulic friction devices used for formation of each gear position in a stepped speed change unit included in a power transmission device of FIG. 1.

FIG. 2 is an operation table indicating combinations of operating states of hydraulic friction devices used for formation of each gear position of the stepped speed change unit 18 included in the power transmission device 14 of FIG. 1. In the operation table of FIG. 2, "O" indicates that the hydraulic friction device in question is in an engaged state, and blank indicates that the device in question is in a disengaged or released state.

In FIG. 2, "N" and "D" respectively indicate a neutral range and a drive range, which are alternatively selected through manual operation of a shift lever (not shown). The neutral range is a non-traveling range selected so as to inhibit the vehicle 10 from traveling, and the drive range is a traveling range selected so as to cause the vehicle 10 to travel forward. The range and gear position of the power transmission device 14 are switched, according to the combination of the engaged and disengaged states of the hydraulic friction devices shown in FIG. 2.

Figure 3:
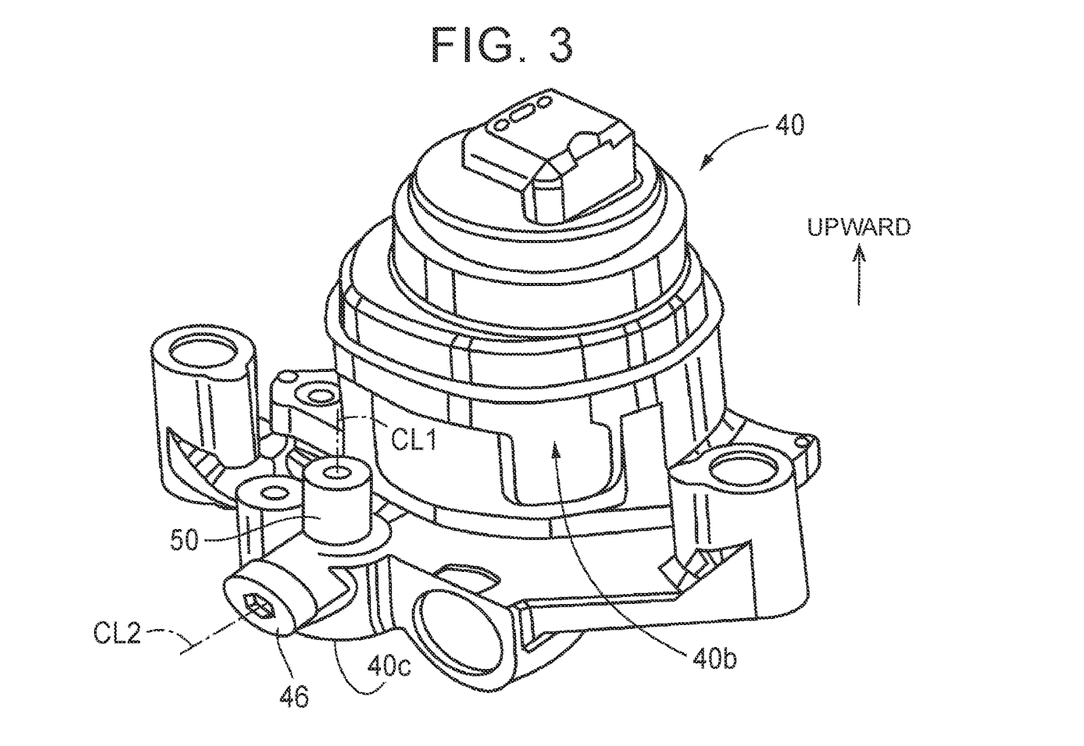
FIG. 3 is a view showing an exterior appearance of an electric oil pump shown in FIG. 1.
Figure 4:
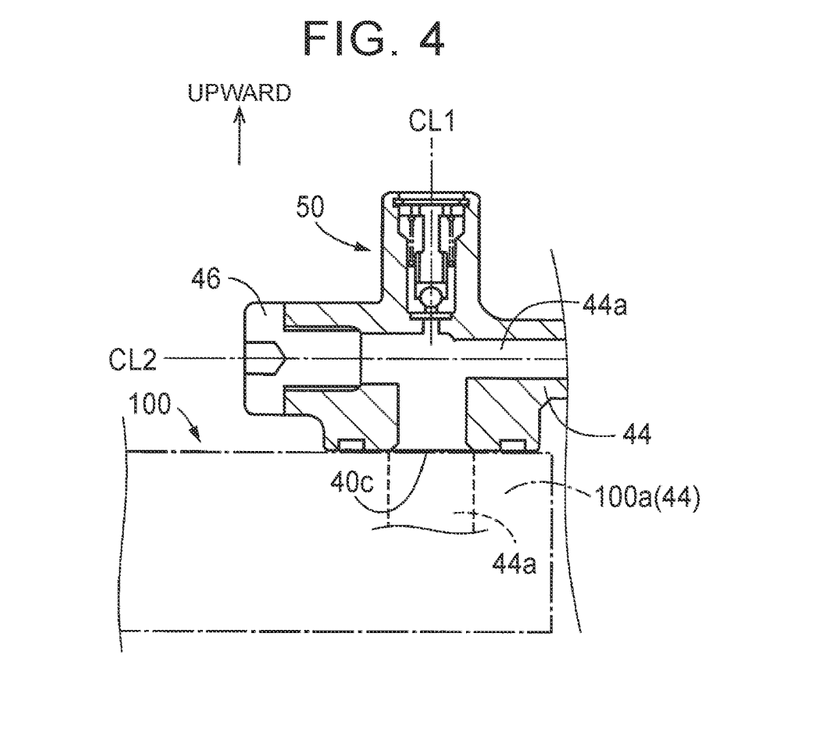
FIG. 4 is a cross-sectional view of the vicinity of a discharge port of the electric oil pump shown in FIG. 3, which view describes the installation position of the breather device according to the first embodiment of the disclosure.

FIG. 3 shows the exterior appearance of the electric oil pump 40 shown in FIG. 1. FIG. 4 is a cross-sectional view of the vicinity of the discharge port 40c of the electric oil pump 40 shown in FIG. 3. The installation position of the breather device 50 according to this embodiment will be described with reference to FIG. 4.

A discharge pipe 44 having a generally cylindrical shape about a second axis CL2 parallel to the horizontal direction is connected at its one end to the pressure increasing portion 40b, and the discharge pipe 44 is closed with a plug 46 screwed into the other end. On the upper side of the discharge pipe 414 on the first axis CL1 parallel to the vertical line, the breather device 50 having a generally cylindrical shape about the first axis CL1 is installed. On the lower side of the discharge pipe 44, the discharge port 40c having a generally circular shape about the first axis CL1 is provided. The oil 98 whose oil pressure has been increased by the pressure increasing portion 40b of the electric oil pump 40 is delivered to a discharge oil passage 44a in the discharge pipe 44, and then discharged to the outside of the electric oil pump 40 from the discharge port 40c. The breather device 50 is installed in the vicinity of the discharge port 40c, on the upper side of the discharge pipe 44 as viewed in the vertical direction. Thus, the breather device 50 is installed above a valve body 100a of the hydraulic control circuit 100 as viewed in the vertical direction. The discharge pipe 44 in this embodiment is one example of the "case" of the disclosure.

The oil 98 discharged from the discharge port 40c is delivered to the discharge oil passage 44a formed in the valve body 100a of the hydraulic control circuit 100. Thus, in the exterior of the electric oil pump 40, the valve body 100a functions as the discharge pipe 44 in which the discharge oil passage 44a is formed inside the valve body 100a.

Figure 5:
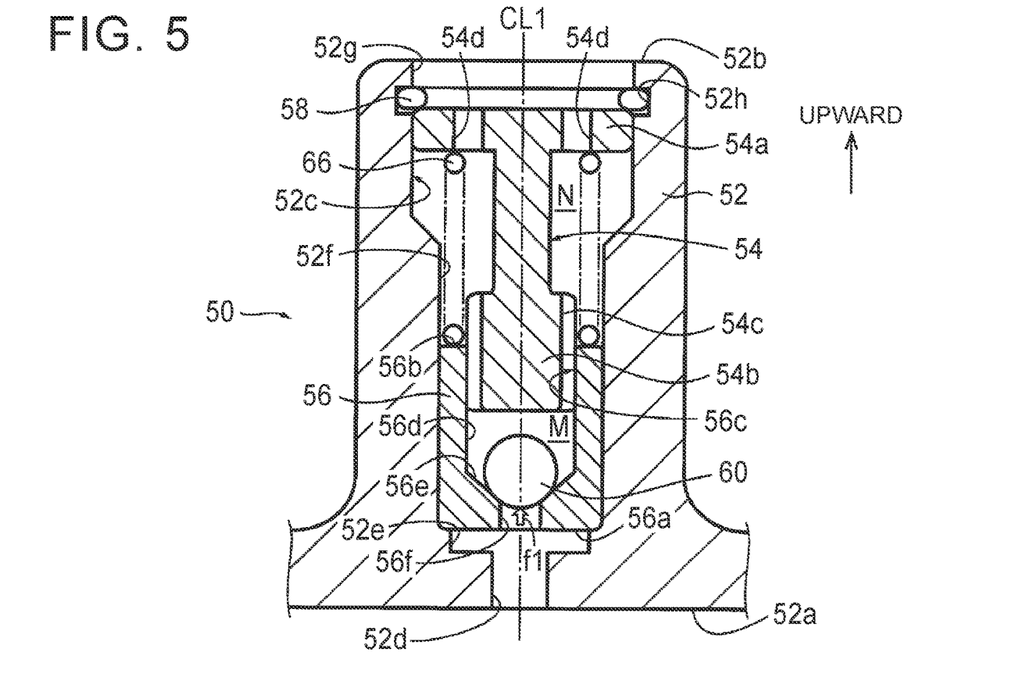
FIG. 5 is a cross-sectional view showing a non-operating state of the breather device shown in FIG. 4.

FIG. 5 is a cross-sectional view of the breather device 50 shown in FIG. 4, and shows a non-operating state of the breather device 50. FIG. 5 and FIG. 6 to FIG. 8 that will be described later are cross-sectional views of the breather device 50 taken in the direction of the first axis CL1. In FIG. 5 through FIG. 8, the first axis CL1 is parallel to the vertical line, and the direction of the first axis CL1 is equivalent to the vertical direction, for the sake of easy understanding of the disclosure.

The breather device 50 includes a main body 52, stopper 54, piston 56, snap ring 58, spherical body 60, and return spring 66.

The main body 52 is a generally cylindrical member having the first axis CL1 as its central axis, and is disposed on the upper side of the discharge pipe 44 as viewed in the direction of the first axis CL1. The lower side of the main body 52 in the direction of the first axis CL1 is a base end portion 52a, which is formed integrally with the discharge pipe 44. Namely, the main body 52 and the discharge pipe 44 are formed from the same member. The upper side of the main body 52 in the direction of the first axis CL1 is a distal end portion 52b. A radially inner portion of the main body 52 provides a through portion 52c that extends through the main body 52 between the base end portion 52a and the distal end portion 52b in the direction of the first axis CL1. The through portion 52c includes a first through-hole 52d, second through-hole 52e, receiving hole 52f, and third through-hole 52g, which are arranged in this order from the base end portion 52a toward the distal end portion 52b in the direction of the first axis CL1. Each of the first through-hole 52d, second through-hole 52e, receiving hole 52f, and third through-hole 52g is a cylindrical cavity having the first axis CL1 as its central axis. The diameter of the second through-hole 52e is larger than that of the first through-hole 52d, and the diameter of the receiving hole 52f is larger than that of the second through-hole 52e, while the diameter of the third through-hole 52g is larger than that of the receiving hole 52f. In the direction of the first axis CL1, the receiving hole 52f and the third through-hole 52g are connected by a tapered slope whose diameter gradually changes in a conical shape. An annular groove 52h is provided in the third through-hole 52g. The first through-hole 52d functions as an inside opening of the breather device 50 that communicates the inside of the discharge pipe 44 with the outside thereof. The third through-hole 52g functions as an outside opening of the breather device 50 that communicates the inside of the discharge pipe 44 with the outside thereof.

The piston 56 is a generally cylindrical member having the first axis CL1 as its central axis, and is fitted in the receiving hole 52f of the main body 52 with a given clearance therebetween. In the direction of the first axis CL1, the lower side of the piston 56 is a base end portion 56a, and the upper side of the piston 56 is a distal end portion 56b. A radially inner portion of the piston 56 has a receiving hole 56c and a communicating hole 56f, and the receiving hole 56c and the communicating hole 56f extend through the piston 56 between the base end portion 56a and the distal end portion 56b in the direction of the first axis CL1. Of the receiving hole 56c and the communicating hole 56f, the communicating hole 56f is located closer to the base end portion 52a, and the receiving hole 56c is located closer to the distal end portion 52b. The communicating hole 56f is a cylindrical cavity having the first axis CL1 as its central axis. The receiving hole 56c extends in the direction of the first axis CL1. A portion of the receiving hole 56c closer to the distal end portion 56b is a cylindrical hole 56d that is a cylindrical cavity having the first axis CL1 as its central axis, and a portion of the receiving hole 56c closer to the base end portion 56a is an inclined portion 56e having a conically inclined face (tapered face) having the first axis CL1 as its central axis. The diameter of the cylindrical hole 56d of the receiving hole 56c is larger than that of the communicating hole 56f. The inclined face of the inclined portion 56e connects the cylindrical hole 56d with the communicating hole 56f in the direction of the first axis CL1. Thus, the piston 56 is provided with the inclined portion 56e whose diameter increases as an upward distance from the communicating hole 56f in the direction of the first axis CL1 increases. The piston 56 is one example of the "cylindrical body" of the disclosure, and the receiving hole 56c is one example of the "hollow portion" of the disclosure.

The stopper 54 is a generally columnar member having the first axis CL1 as its central axis. In the direction of the first axis CL1, an upper portion of the stopper 54 is a flange portion 54a, and a lower portion of the stopper 54 is a shaft portion 54b. The flange portion 54a has a disc-like shape, and the shaft portion 54b in the form of a solid cylinder protrudes downward in the direction of the first axis CL1, from a radially central portion of the flange portion 54a. The flange portion 54a is fitted in the third through-hole 52g of the main body 52, and is housed in a portion of the third through-hole 52g located below the annular groove 52h in the direction of the first axis CL1, by use of the snap ring 58 fitted in the annular groove 52h. The flange portion 54a of the stopper 54 is pressed against the snap ring 58, by the return spring 66 that will be described later, such that the stopper 54 cannot move in the direction of the first axis CL1. A lower end portion of the shaft portion 54b is fitted in the cylindrical hole 56d of the receiving hole 56c of the piston 56 with a given clearance therebetween. The cylindrical hole 56d is one example of the "portion of the hollow portion in which the stopper is fitted" of the disclosure.

In an outer circumferential surface of a lower end portion of the shaft portion 54b fitted in the receiving hole 56c of the piston 56, grooves 54c that extend in the direction of the first axis CL1 are provided at intervals of a given angle in the circumferential direction. The flange portion 54a has through-holes 54d that are provided at intervals of a given angle in the circumferential direction, and extend through the flange portion 54a in the direction of the first axis CL1. The piston 56 is able to move along the first axis CL1 while sliding in the direction of the first axis CL1, between the receiving hole 52f of the main body 52 and the lower end portion of the shaft portion 54b of the stopper 54. The given clearance between the receiving hole 52f of the main body 52 and the piston 56, and the given clearance between the cylindrical hole 56d of the piston 56 and the lower end portion of the shaft portion 54b are large enough to allow the piston 56 to slide between the main body 52 and the stopper 54.

In a second space N in the through portion 52c of the main body 52, which is defined by the stopper 54 and the distal end portion 56b of the piston 56, the return spring 66 is provided between the flange portion 54a of the stopper 54 and the distal end portion 56b of the piston 56, for biasing the piston 56 downward in the direction of the first axis CL1. The return spring 66 biases the flange portion 54a of the stopper 54 upward in the direction of the first axis CL1.

The spherical body 60 is a steel ball, for example. The spherical body 60 is located in a first space M in the receiving hole 56c of the piston 56, which is partially defined by the lower end portion of the shaft portion 54b of the stopper 54. The spherical body 60 sinks downward in the direction of the first axis CL1, due to the self-weight of the spherical body 60. The spherical body 60 abuts against the inclined portion 56e of the piston 56, so that the spherical body 60 blocks the communicating hole 56f of the piston 56. The diameter of the spherical body 60 is larger than that of the communicating hole 56f. The communicating hole 56f is provided below the first space M as viewed in the direction of the first axis CL1. The first space M is one example of the "space" of the disclosure, and the spherical body 60 is one example of the "blocking body" of the disclosure.

As will be described later, when the spherical body 60 is not blocking the communicating hole 56f, a discharge pathway FL (see FIG. 6) that extends through the first through-hole 52d and second through-hole 52e of the main body 52, communicating hole 56f of the piston 56, first space M, groove 54c of the stopper 54, second space N, through-hole 54d of the stopper 54, and third through-hole 52g of the main body 52 is formed. With the discharge pathway FL thus formed, the breather device 50 communicates the inside of the discharge pipe 44 with the outside thereof.

On the other hand, when the breather device 50 is in a non-operating state, as shown in FIG. 5, the piston 56 moves downward along the first axis CL1, under the bias force of the return spring 66, and the spherical body 60 sinks downward in the direction of the first axis CL1 and blocks the communicating hole 56f. Thus, the discharge pathway FL is not formed, and the breather device 50 shuts off communication between the inside and outside of the discharge pipe 44.

Figure 6:
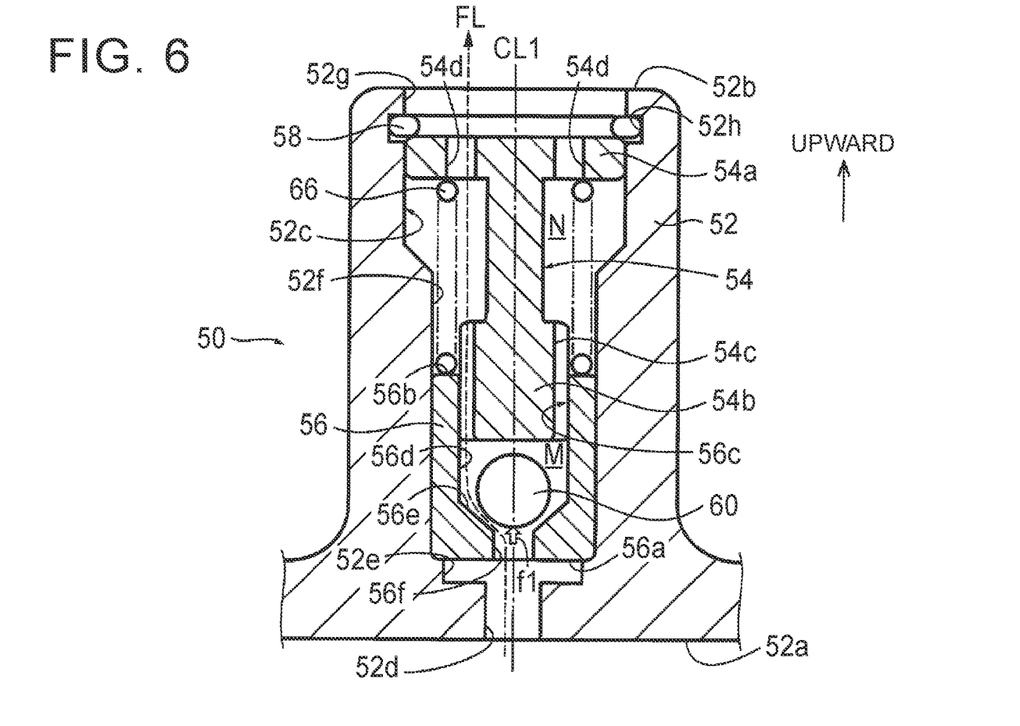
FIG. 6 is a cross-sectional view showing an air discharge state of the breather device shown in FIG. 4.

FIG. 6 is a cross-sectional view of the breather device 50 shown in FIG. 4, and shows an air discharge state of the breather device 50. When the pressure P inside the discharge pipe 44 rises, and pressing force f1 [N] applied upward in the direction of the first axis CL1 to the spherical body 60 via the communicating hole 56f exceeds the self-weight (gravity) of the spherical body 60, the spherical body 60 moves upward in the first space M. As a result, the communicating hole 56f ceases to be blocked, and the discharge pathway FL indicated by the broken-line arrow in FIG. 6 is formed, so that air is discharged from the inside of the discharge pipe 44 toward the outside of the discharge pipe 44. In this connection, a first pressure value Pos1 [MPa] represents the pressure P inside the discharge pipe 44 obtained when the pressing force f1 applied upward in the direction of the first axis CL1 to the spherical body 60 via the communicating hole 56f due to the pressure P [MPa] (atmospheric pressure) inside the discharge pipe 44 is equal to the self-weight (gravity) of the spherical body 60. Also, the self-weight of the piston 56, bias force generated by the return spring 66, and inside pressure-receiving area A1 and outside pressure-receiving area A2 that will be described later, are determined, so that the piston 56 does not move upward in the direction of the first axis CL1, even at the maximum atmospheric pressure that can be generated inside the discharge pipe 44. The first pressure value Pos1 is one example of the "first predetermined value" of the disclosure.

Figure 7:
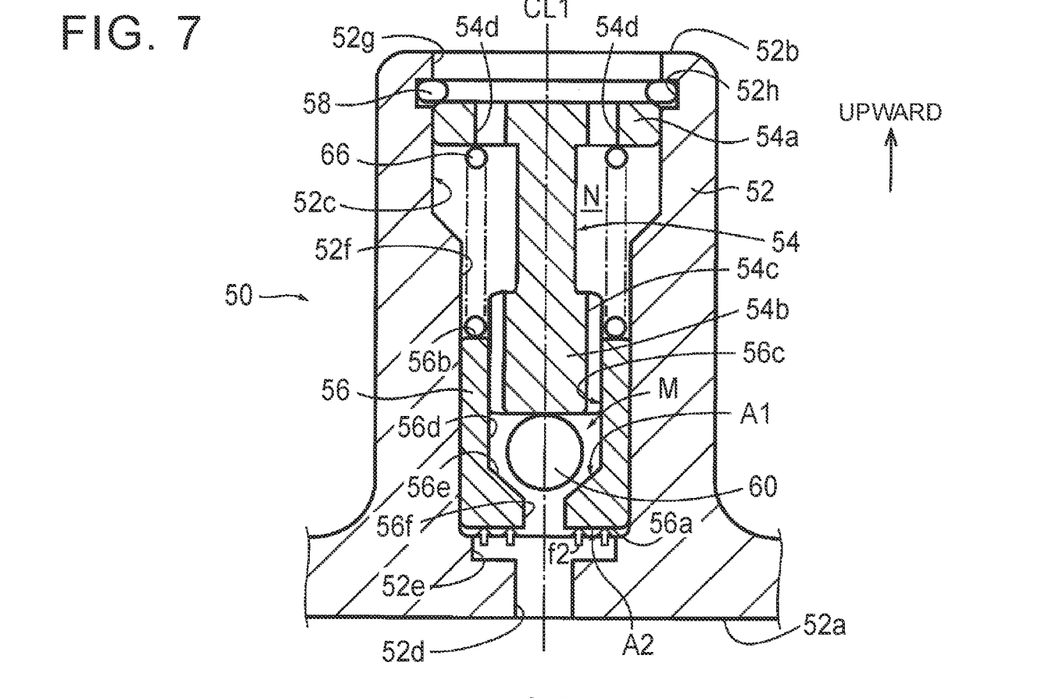
FIG. 7 is a cross-sectional view showing a valve closing state of the breather device shown in FIG. 4.

FIG. 7 is a cross-sectional view of the breather device 50 shown in FIG. 4, and shows a valve closing state of the breather device 50. When the breather device 50 finishes discharging air, and the oil level of the oil 98 in the discharge pipe 44 rises and reaches an end face of the base end portion 56a of the piston 56, the piston 56 receives upward force in the direction of the first axis CL1, due to the oil pressure of the oil 98 poured into the second through-hole 52e of the main body 52. As a result, the piston 56 moves upward in the direction of the first axis CL1.

The outside pressure-receiving area A2 [mm²] as a pressure-receiving area on the outer side of the base end portion 56a of the piston 56 is larger than the inside pressure-receiving area A1 [mm²] as a pressure-receiving area on the inner side of the base end portion 56a of the piston 56. In this specification, the pressure-receiving area means an area over which the piston 56 receives the oil pressure that contributes to thrust force that urges the piston 56 upward or downward in the direction of the first axis CL1.

As described above, the diameter of the communicating hole 56f is smaller than that of the cylindrical hole 56d of the receiving hole 56c. Thus, when the oil 98 flows into the first space M of the piston 56, through the communicating hole 56f of the piston 56 and a clearance between the spherical body 60 and the inclined portion 56e, the inside oil pressure P1 [MPa] as the oil pressure of the oil 98 in the first space M becomes lower than the outside oil pressure P2 [MPa] as the oil pressure of the oil 98 in the second through-hole 52e on the outer side of the base end portion 56a of the piston 56.

Accordingly, with the oil pressure of the oil 98, pressing force f2 [N] calculated as "P2×A2−P1×A1" is applied upward in the direction of the first axis CL1, to the piston 56. When the pressing force f2 exceeds the sum of the self-weight (gravity) of the piston 56 and the bias force of the return spring 66, the piston 56 moves while sliding upward in the direction of the first axis CL1. A second pressure value Pos2 [MPa] represents the pressure P inside the discharge pipe 44 obtained when the pressing force f2 is equal to the sum of the self-weight (gravity) of the piston 56 and the bias force of the return spring 66. The second pressure value Pos2 can be set with accuracy, based on the pressing force f2, self-weight (gravity) of the piston 56, and the bias force of the return spring 66. The second pressure value Pos2 is one example of the "second predetermined value" of the disclosure.

In the valve closing state as shown in FIG. 7, when the piston 56 moves upward in the direction of the first axis CL1 relatively quickly, the pressure in the first space M temporarily rises as the volume of the first space M is reduced, because the grooves 54c that communicate the first space M with the second space N have large flow resistance to air and the oil 98. Therefore, the speed of the piston 56 that moves upward in the direction of the first axis CL1 is reduced, due to the pressure in the first space M. Accordingly, the piston 56 collides with the spherical body 60 while its speed is being reduced.

Figure 8:
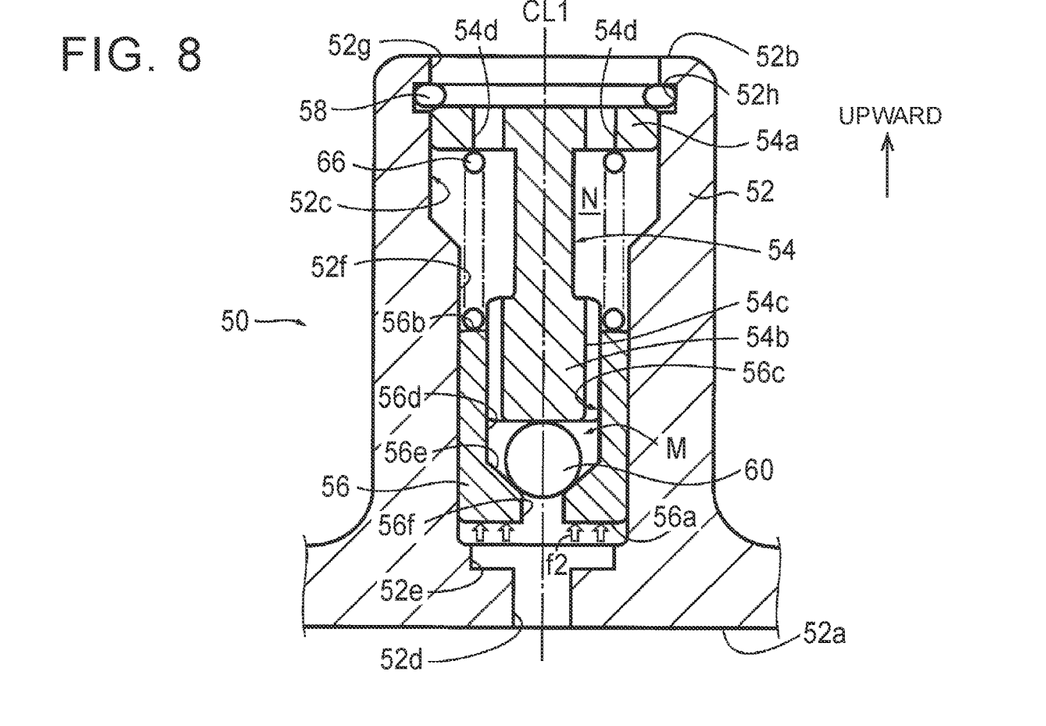
FIG. 8 is a cross-sectional view showing a valve closed state of the breather device shown in FIG. 4.

FIG. 8 is a cross-sectional view of the breather device 50 shown in FIG. 4, and shows a valve closed state of the breather device 50. The upward movement of the spherical body 60 is stopped by a distal end of the lower end portion of the shaft portion 54b of the stopper 54. When the piston 56 keeps moving upward in the direction of the first axis CL1, the clearance between the inclined portion 56e of the piston 56 and the spherical body 60 is reduced, and the inclined portion 56e and the spherical body 60 are eventually brought into contact with each other. Thus, the inclined portion 56e of the piston 56 is pressed against the spherical body 60 (the spherical body 60 blocks the communicating hole 56f), due to the oil pressure of the oil 98 in the discharge pipe 44, so that the oil 98 is prevented from leaking to the outside of the breather device 50.

In the valve closed state shown in FIG. 8, when the pressure P inside the discharge pipe 44 is reduced, the piston 56 and the spherical body 60 move downward along the first axis CL1, and the breather device 50 returns to the non-operating state as shown in FIG. 5.

Figure 9:
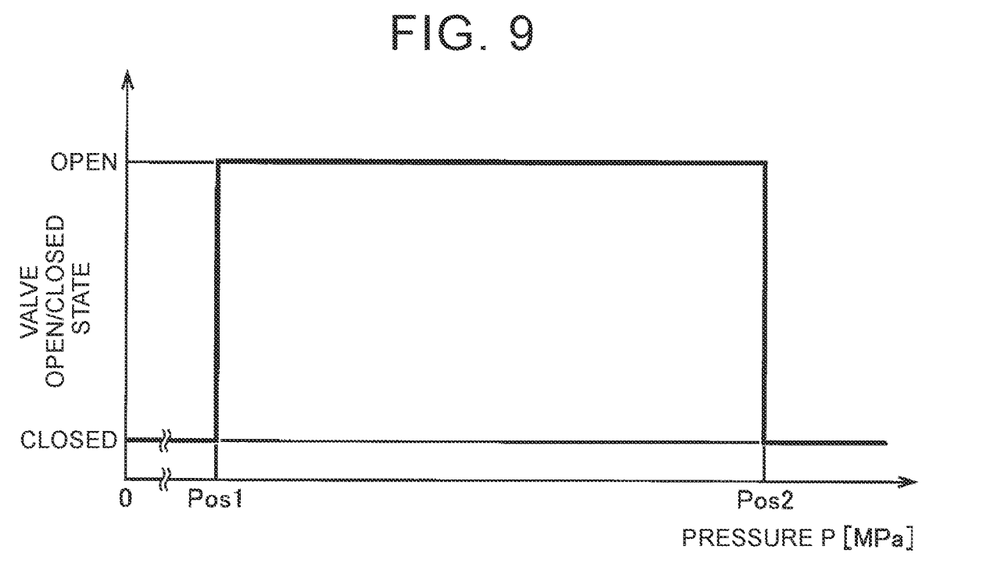
FIG. 9 is a view useful for describing valve opening/closing characteristics of the breather device shown in FIG. 4.

FIG. 9 is a view useful for describing the valve opening/closing characteristics of the breather device 50 shown in FIG. 4. FIG. 9 is used for describing the valve opened/closed state of the breather device 50 when the pressure P inside the discharge pipe 44 is increased.

When the pressure P inside the discharge pipe 44 is equal to or lower than the first pressure value Pos1, the pressing force f1 applied upward in the direction of the first axis CL1 to the spherical body 60 via the communicating hole 56f due to the pressure P (atmospheric pressure) is equal to or smaller than the self-weight (gravity) of the spherical body 60; therefore, the spherical body 60 blocks the communicating hole 56f, and the breather device 50 is in the valve closed state.

When the pressure P inside the discharge pipe 44 exceeds the first pressure value Pos1 and becomes equal to or lower than the second pressure value Post, the pressing force f1 applied upward in the direction of the first axis CL1 to the spherical body 60 via the communicating hole 56f due to the pressure P (atmospheric pressure) is larger than the self-weight (gravity) of the spherical body 60; therefore, the spherical body 60 moves upward in the first space M. As a result, the communicating hole 56*f* ceases to be blocked, and the discharge pathway FL is formed, so that the breather device 50 is placed in the valve open state. In this condition, since the pressure P is equal to or lower than the second pressure value Pos2, the piston 56 does not move upward in the direction of the first axis CL1.

When the pressure P inside the discharge pipe 44 exceeds the second pressure value Pos2, the piston 56 moves upward in the direction of the first axis CL1, and the communicating hole 56*f* of the piston 56 is blocked again by the spherical body 60; as a result, the breather device 50 is placed in the valve closed state.

According to this embodiment, the breather device 50 includes (a) the piston 56 in which the receiving hole 56*c* that extends in the vertical direction (the direction of the first axis CL1) is formed, (b) the stopper 54 inserted in the receiving hole 56*c*, and (c) the spherical body 60 that is located in the first space M of the receiving hole 56*c* defined by the stopper 54, and blocks the communicating hole 56*f* provided in a lower portion of the piston 56 as viewed in the vertical direction, and (d) the communicating hole 56*f* ceases to be blocked when the pressure P inside the discharge pipe 44 exceeds the first pressure value Pos1, and the spherical body 60 moves upward in the first space M. Thus, the communicating hole 56*f* ceases to be blocked when the pressing force f1 applied upward in the vertical direction to the spherical body 60 due to the pressure P inside the discharge pipe 44 exceeds the self-weight (gravity) of the spherical body 60. Thus, the first pressure value Pos1 at which air is discharged from within the discharge pipe 44 can be set to a lower value, as compared with the case where bias force other than the self-weight is applied to the spherical body 60, and air can be discharged if the pressure P inside the discharge pipe 44 exceeds the first pressure value Pos1 that is set to a relatively low value. Also, when the pressure P inside the discharge pipe 44 is equal to or lower than the first pressure value Pos1, the communicating hole 56*f* is blocked by the spherical body 60, so that air outside the discharge pipe 44 is prevented from being sucked into the discharge pipe 44.

According to this embodiment, (a) the piston 56 has the inclined portion 56*e* whose diameter increases as an upward distance from the communicating hole 56*f* in the vertical direction increases, and (b) the communicating hole 56*f* is blocked when the spherical body 60 having the larger diameter than the communicating hole 56*f* sinks along the inclined portion 56*e*. Thus, the spherical body 60 is configured to sink along the inclined portion 56*e* and block the communicating hole 56*f*; therefore, the communicating hole 56*f* can be blocked even when the vehicle 10 is inclined, namely, even when the discharge pipe 44 is inclined.

According to this embodiment, (a) the breather device 50 has the main body 52 in which the through portion 52*c* that extends through the main body 52 in the vertical direction is formed, (b) the piston 56 is fitted in the through portion 52*c*, and the stopper 54 is fitted in the receiving hole 56*c*, such that the piston 56 can move in the vertical direction, and (c) the communicating hole 56*f* is blocked when the pressure P inside the discharge pipe 44 exceeds the second pressure value Pos2 that is higher than the first pressure value Pos1, and the piston 56 moves upward in the vertical direction. With this arrangement, when the oil 98 flows from the inside of the discharge pipe 44 into the receiving hole 56*c* of the breather device 50, and the pressure P inside the discharge pipe 44 exceeds the second pressure value Pos2, the piston 56 is moved upward, so that the spherical body 60 blocks the communicating hole 56*f*. As a result, flow of the oil 98 from the inside to the outside of the discharge pipe 44 via the breather device 50 is curbed.

According to the embodiment, the diameter of the communicating hole 56*f* is smaller than that of the cylindrical hole 56*d* of the receiving hole 56*c* in which the shaft portion 54*b* of the stopper 54 is fitted. Thus, when the oil 98 flows from the inside of the discharge pipe 44 to the receiving hole 56*c* of the breather device 50, the inside oil pressure P1 as the oil pressure of the oil 98 in the receiving hole 56*c* of the piston 56 as the destination of the flow can be made smaller than the outside oil pressure P2 as the oil pressure of the oil 98 on the outer side of the piston 56 (the inner side of the discharge pipe 44) as the origin of the flow. Thus, the pressing force f2 that moves the piston 56 upward in the vertical direction (force obtained by subtracting the product of the inside oil pressure P1 and the inside pressure-receiving area A1 from the product of the outside oil pressure P2 and the outside pressure-receiving area A2) can be set with an increased degree of freedom, and the second pressure value Pos2 at which the spherical body 60 blocks the communicating hole 56*f* can be set with an increased degree of freedom.

According to this embodiment, the diameter of the communicating hole 56*f* is equal to or larger than one millimeter (mm). When the diameter of the communicating hole 56*f* is equal to or larger than one millimeter, the oil 98 containing air can easily pass through the communicating hole 56*f*, and therefore, air contained in the oil 98 can be discharged.

According to this embodiment, the volume of the first space M is reduced as the piston 56 moves upward in the vertical direction. As the volume of the first space M is reduced due to upward movement of the piston 56 in the vertical direction, the pressure in the first space M increases accordingly. Thus, the piston 56 moves upward in the vertical direction while its speed is reduced due to the pressure in the first space M; therefore, an impact applied to the spherical body 60 when the piston 56 collides with the spherical body 60 is alleviated, and the durability of the breather device 50 is improved.

According to this embodiment, the breather device 50 communicates the inside with the outside of the discharge pipe 44 to which the oil 98 whose oil pressure has been increased by the electric oil pump 40 is delivered. Thus, the oil pressure in the discharge pipe 44 to which the oil 98 is delivered from the electric oil pump 40 is promptly elevated, and flow of the oil 98 to the outside of the discharge pipe 44 via the breather device 50 can be curbed. Generally, immediately after the electric oil pump 40 is assembled with the power transmission device 14, or when driving of the electric oil pump 40 is stopped for a long period, air is likely to be accumulated in the suction oil passage 42*a*. If the electric oil pump 40 starts being driven in this condition, the electric oil pump 40 initially sucks in air accumulated in the suction oil passage 42*a*, and discharges the air into the discharge oil passage 44*a*. Therefore, in a condition where air is accumulated in the suction oil passage 42*a*, the oil pressure of the oil 98 delivered from the discharge port 40*c* of the electric oil pump 40 may not be promptly elevated, as compared with the case where no air is accumulated in the suction oil passage 42*a*. However, when the breather device 50 is used for the discharge pipe 44, air is discharged from within the discharge pipe 44 if the pressure P inside the discharge pipe 44 exceeds the first pressure value Pos1 that is set to a relatively low value. Thus, air is quickly discharged from within the discharge pipe 44. Therefore, the oil pressure of the oil 98 delivered from the discharge port 40c of the electric oil pump 40 is quickly elevated, namely, the response of the oil pressure of the oil 98 delivered when the electric oil pump 40 starts being driven is quickened.

Figure 10:
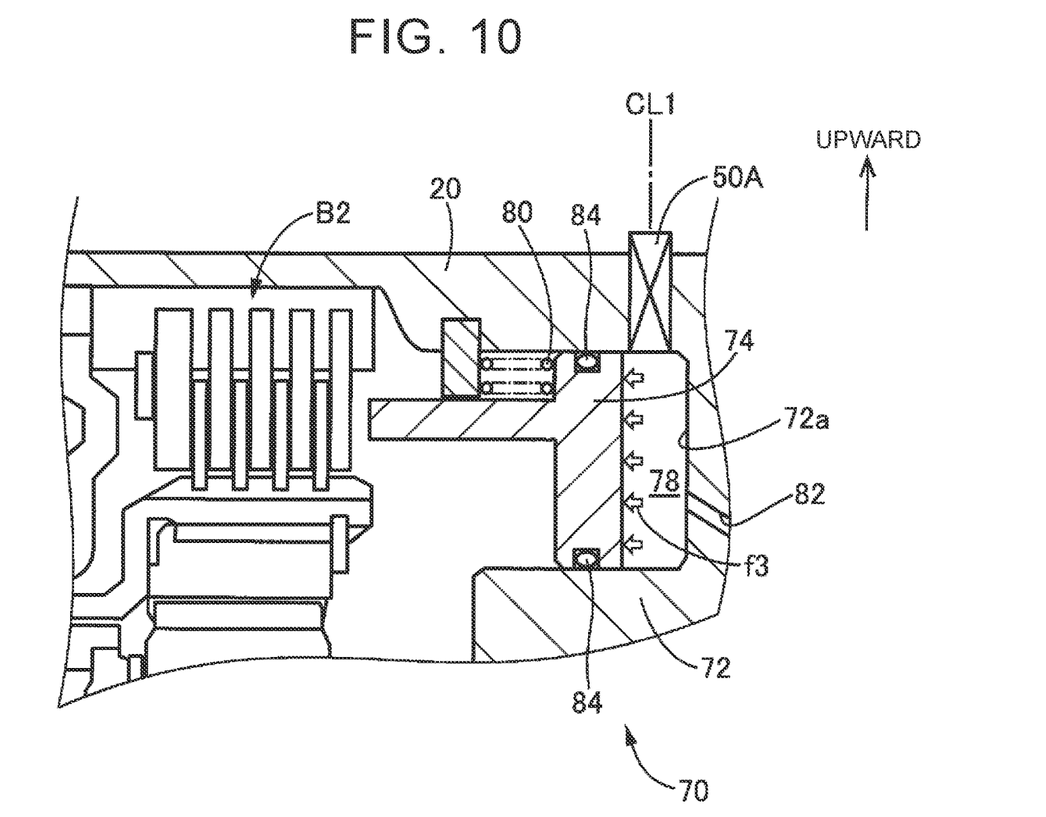
FIG. 10 is a cross-sectional view showing the configuration of a second brake as a hydraulic friction device included in the stepped speed change unit shown in FIG. 1, which view describes the installation position of a breather device according to a second embodiment of the disclosure.

FIG. 10 is a cross-sectional view showing the configuration of the second brake B2 as a hydraulic friction device included in the stepped speed change unit 18 shown in FIG. 1. Referring to FIG. 10, the installation position of a breather device 50A according to a second embodiment of the disclosure will be described. FIG. 10 is a part of the cross-sectional view of the second brake B2 taken in the direction of the rotation center line C (see FIG. 1). This embodiment has substantially the same configuration as the first embodiment, but is different from the first embodiment in that the vehicle 10 includes the breather device 50A in place of the breather device 50. The breather device 50A has substantially the same configuration as the breather device 50 of the first embodiment, but the installation position of the breather device 50A is different from that of the breather device 50. Thus, the difference will be mainly described, and the same reference signs are assigned to components or portions having substantially the same functions as those of the first embodiment, and description of these components or portions will be omitted as appropriate.

An actuator 70 includes an oil chamber case 72, an annular member 74, and a spring 80.

The oil chamber case 72 is a portion of the housing 20 in which an annular groove 72a having the rotation center line C as its central axis is formed on the inner side of the housing 20.

The annular member 74, which is fitted in the annular groove 72a of the oil chamber case 72, can slide in the direction of the rotation center line C, and cannot rotate relative to the oil chamber case 72 about the rotation center line C. An oil chamber 78 is formed between the oil chamber case 72 and the annular member 74. A pair of O rings 84 are mounted between the annular member 74 and a radially inner wall of the annular groove 72a, and between the annular member 74 and a radially outer wall of the annular groove 72a, so as to ensure oil tightness of the oil chamber 78.

The spring 80 biases the annular member 74 in such a direction (releasing direction) as to disengage the second brake B2 as described later.

A control oil pressure can be supplied from the hydraulic control circuit 100 to the oil chamber 78, via an oil pressure supply hole 82 formed in the oil chamber case 72 (housing 20). When the control oil pressure for engaging the second brake B2 is supplied from the hydraulic control circuit 100 to the oil chamber 78, pressing force f3 [N] generated from the control oil pressure acts on the annular member 74, against the bias force of the spring 80, so that the annular member 74 is pushed toward friction plates of the second brake B2. As a result, the friction plates of the second brake B2 are pressed, and the second brake B2 is brought into the engaged state. When the control oil pressure for engaging the second brake B2 is not supplied from the hydraulic control circuit 100 to the oil chamber 78, the annular member 74 is retracted from the friction plates of the second brake B2, under the bias force of the spring 80. As a result, the friction plates of the second brake B2 cease to be pressed, and the second brake B2 is brought into the released state.

The breather device 50A is placed in an upper portion of the oil chamber case 72 of the oil chamber 78 as viewed in the vertical direction, in the actuator 70 that controls the second brake B2 that forms gear positions of the stepped speed change unit 18. The breather device 50A communicates the inside with the outside of the oil chamber case 72 of the actuator 70 that controls engagement and release of the second brake B2. Thus, the breather device 50A is placed on the upper side in the vertical direction of the oil chamber 78 of the actuator 70 that controls the second brake B2 that forms gear positions of the stepped speed change unit 18. In this embodiment, the oil chamber case 72 is one example of the "case" of the disclosure, and the second brake B2 is one example of the "brake for transmission" of the disclosure.

According to this embodiment, the breather device 50A communicates the inside with the outside of the oil chamber case 72 that defines the oil chamber 78 of the actuator 70 that controls engagement and release of the second brake B2 that forms gear positions of the stepped speed change unit 18. With this arrangement, air present in the oil chamber 78 of the actuator 70 is quickly discharged, so that the initial response of the second brake B2 is quickened, and the shift response performance is stabilized. While the shift response performance is stabilized, flow of the oil 98 to the outside of the oil chamber case 72 via the breather device 50A is curbed, and a loss of flow of the oil 98 in the oil chamber 78 of the actuator 70 is reduced.

While the embodiments of the disclosure have been described based on the drawings, the disclosure may be applied in other forms.

While the first axis CL1 is parallel to the vertical line in the first and second embodiments, the disclosure is not limited to this arrangement. For example, the first axis CL1 may be inclined by an angle corresponding to a gradient of a road on which the vehicle 10 is located, relative to the vertical line.

While the piston 56 as a cylindrical body is configured to be able to move in the vertical direction in the first and second embodiments, the cylindrical body may be configured to be unable to move. For example, in the first embodiment, the piston 56 and the main body 52 may be formed integrally from the same member, and the cylindrical body may be configured to be unable to move in the vertical direction. In this case, the cylindrical body may have a function of fixing the stopper 54, and the stopper 54 may be fixed so as to be unable to move in the vertical direction by another method, such as screwing, instead of the snap ring 58 and the return spring 66. Since it is not necessary to slide the piston 56, the given clearance between the cylindrical hole 56d of the piston 56 as an integral part of the main body 52 and the lower end portion of the shaft portion 54b is only required to be smaller than the diameter of the spherical body 60, so that the spherical body 60 as the blocking body does not pop out into the outside of the breather device 50.

While the return spring 66 is provided for biasing the piston 56 downward in the direction of the first axis CL1 in the first and second embodiments, the return spring 66 is not necessarily provided. For example, when the force that urges the piston 56 downward in the direction of the first axis CL1 is sufficiently provided by the self-weight (gravity) of the piston 56, the return spring 66 may not be provided.

While the inclined portion 56e provided below the receiving hole 56c in the direction of the first axis CL1 has an inclined (tapered) face having a conical shape in the first and second embodiments, the inclined portion 56e is not limited to this type. For example, the inclined portion 56e provided below the receiving hole 56c may be elliptically shaped such that its diameter is gradually reduced. In sum, the inclined portion 56e may be formed in any shape provided that the communicating hole 56f can be blocked by the spherical body 60 that sinks downward along the inclined portion 56e even when the breather device 50 is inclined.

While the inclined portion 56e is provided below the receiving hole 56c in the direction of the first axis CL1 in the first and second embodiments, the inclined portion 56e may not be provided. For example, when the whole receiving hole 56c is provided by the cylindrical hole 56d, and the center of gravity of the spherical body 60 overlaps the communicating hole 56f in a cross-section as viewed in the vertical direction, no matter where the spherical body 60 exists in the first space M of the piston 56, the spherical body 60 can sink in the communicating hole 56f due to its own weight, and block the communicating hole 56f.

While the blocking body that blocks the communicating hole 56f is the spherical body 60 in the first and second embodiments, the blocking body is not limited to this. The blocking body may be a solid object having another shape, provided that it can block the communicating hole 56f. For example, the inclined portion 56e may not be provided, and the blocking body may have a solid cylindrical body. When the cylindrical blocking body overlaps the communicating hole 56f in a cross-section as viewed in the vertical direction no matter where the blocking body exists in the first space M of the piston 56, the blocking body sinks into a lower part of the first space M due to its own weight, and can block the communicating hole 56f.

While the breather device 50 is located in the vicinity of the discharge port 40c of the discharge pipe 44 of the electric oil pump 40 in the first embodiment, the location of the breather device 50 is not limited to this. For example, the breather device 50 may be located on an oil pipe either on the inner side or on the outer side of the electric oil pump 40 relative to the discharge port 40c, provided that the oil 98 is delivered from the pressure increasing portion 40b of the electric oil pump 40 to the oil pipe. Also, while the oil pump is the electric oil pump 40 of the internal gear type or external gear type, it is not limited to these types. For example, the oil pump may be of another type, such as a vane pump or a piston pump, or may be a mechanical oil pump.

While the breather device 50A is installed in the upper part, in the direction of the first axis CL1, of the oil chamber case 72 of the oil chamber 78 of the actuator 70 of the second brake B2 as a hydraulic friction device, the location of the breather device 50A is not limited to this. For example, the breather device 50A may be installed in the upper part in the vertical direction of an oil chamber case that defines an oil chamber of an actuator that controls another brake for transmission, such as the first brake B1 as a hydraulic friction device.

While the base end portion 52a of the main body 52 of the breather device 50 is formed integrally with the discharge pipe 44, using the same member, in the first embodiment, the main body 52 may be formed from a member different from the discharge pipe 44, and the breather device 50 may be mounted on the discharge pipe 44.

The above-described embodiments are mere examples, and the disclosure may be embodied with various changes or improvements, based on the knowledge of those skilled in the art.

What is claimed is:

1. A breather device that communicates an inside of a case with an outside of the case in a vertical direction, the breather device comprising:
   a main body having a through portion that extends through the main body in the vertical direction;
   a cylindrical body in the through portion having a hollow portion that extends in the vertical direction, the cylindrical body configured to move in the vertical direction relative to the through portion;
   a stopper inserted in the hollow portion; and
   a blocking body that is located in a space defined by the stopper in the hollow portion, and blocks a communicating hole provided in a lower part of the cylindrical body as viewed in the vertical direction, wherein
   the communicating hole ceases to be blocked when a pressure inside the case exceeds a first predetermined value, and the blocking body moves upward in the vertical direction in the space.

2. The breather device according to claim 1, wherein the cylindrical body includes an inclined portion having a diameter that increases as an upward distance from the communicating hole in the vertical direction increases, and the blocking body is a spherical body having a larger diameter than the communicating hole, the blocking body being configured to block the communicating hole when the blocking body sinks along the inclined portion.

3. The breather device according to claim 1, wherein
   the communicating hole is configured to be blocked when the pressure inside the case exceeds a second predetermined value that is higher than the first predetermined value, and the cylindrical body moves upward in the vertical direction.

4. The breather device according to claim 3, wherein the communicating hole has a smaller diameter than a portion of the hollow portion in which the stopper is fitted.

5. The breather device according to claim 4, wherein the diameter of the communicating hole is equal to or larger than one millimeter.

6. The breather device according to claim 3, wherein a volume of the space is reduced as the cylindrical body moves upward in the vertical direction.

7. The breather device according to claim 1, wherein the case is an oil pipe to which oil having an oil pressure increased by an oil pump is delivered.

8. The breather device according to claim 1, wherein the case is an oil chamber case of an oil chamber in an actuator that controls a brake for a transmission.

9. A breather device that communicates an inside of a case with an outside of the case in a vertical direction, the breather device comprising:
   a cylindrical body having a hollow portion that extends in the vertical direction, the cylindrical body configured to move in the vertical direction;
   a stopper inserted in the hollow portion;
   a blocking body that is located in a space defined by the stopper in the hollow portion, and blocks a communicating hole provided in a lower part of the cylindrical body as viewed in the vertical direction; and
   a return spring that presses an upper part of the cylindrical body and that biases the cylindrical body, wherein
   the communicating hole ceases to be blocked when a pressure inside the case exceeds a first predetermined value, and the blocking body moves upward in the vertical direction in the space.

* * * * *